United States Patent [19]
[11] 3,876,868

Cramwinckel et al.

[45] Apr. 8, 1975

[54] PRIORITY COUNTER

[75] Inventors: Hans Cramwinckel; Jan Leonardus Van Weelden, both of Beekbergen, Netherlands

[73] Assignee: U.S. Philips Corporation, New York, N.Y.

[22] Filed: Mar. 21, 1973

[21] Appl. No.: 343,440

[30] Foreign Application Priority Data

Mar. 21, 1972 Netherlands ....................... 7204421

[52] U.S. Cl. ..... 235/92 ST; 235/92 R; 340/147 CN

[51] Int. Cl. ............................................ H04q 3/00

[58] Field of Search ....... 235/92 EA, 92 ST, 92 GD; 340/147 A, 147 C, 147 CV, 147 CN, 147 LP

[56] References Cited

UNITED STATES PATENTS

| | | | |
|---|---|---|---|
| 3,173,094 | 3/1965 | Hoegeman | 340/147 CN |
| 3,277,456 | 10/1966 | Meyers | 340/147 CN |
| 3,515,341 | 6/1970 | Frick | 235/92 ST |
| 3,602,699 | 8/1971 | Kamachi et al. | 235/92 EA |
| 3,724,534 | 4/1973 | Weatherston | 235/92 ST |

*Primary Examiner*—Gareth D. Shaw
*Assistant Examiner*—Joseph M. Thesz, Jr.
*Attorney, Agent, or Firm*—Frank R. Trifari; George B. Berka

[57] ABSTRACT

The priority determing device includes an interrogation counter driven by clock pulses for a predetermined period and coupled to a plurality of request line terminals, a blocking device for stopping the counter upon occurence of a first request signal on a terminal, and means for producing a treatment signal, which is delayed about a time interval exceeding the time between the stopping of the counter and the end of the predetermined counting period.

7 Claims, 4 Drawing Figures

| | | | | | |
|---|---|---|---|---|---|
| N 0 | K1 | | R 0' | A' C'D' | B |
| N 1 | | K2 | R 1' | B C'D' | A |
| N 2 | K1 | | R 2' | A C'D' | B' |
| N 3 | | K2 | R 3' | B'C'D' | D |
| N 4 | K1 | | R 4' | B'C'D | B |
| N 5 | | K2 | R 5' | A C'D | A' |
| N 6 | K1 | | R 6' | B C'D | B' |
| N 7 | | K2 | R 7' | A' C'D | C |
| N 8 | K1 | | R 8' | A' C D | B |
| N 9 | | K2 | R 9' | B C D | A |
| N 10 | K1 | | R 10' | A C D | B' |
| N 11 | | K2 | R 11' | B'C D | D' |
| N 12 | K1 | | R 12' | B'C D' | B |
| N 13 | | K2 | R 13' | A C D' | A' |
| N 14 | K1 | | R 14' | B C D' | B' |
| N 15 | | K2 | R 15' | A' C D' | C' |
| N 20 | DL | | C 0 | A'B'C'D' | OK 0' |
| N 21 | DL | | C 1 | A'B C'D' | OK 1' |
| N 22 | DL | | C 2 | A B C'D' | OK 2' |
| N 23 | DL | | C 3 | A B'C'D' | OK 3' |
| N 24 | DL | | C 4 | A B'C'D | OK 4' |
| N 25 | DL | | C 5 | A B C'D | OK 5' |
| N 26 | DL | | C 6 | A'B C'D | OK 6' |
| N 27 | DL | | C 7 | A'B'C'D | OK 7' |
| N 28 | DL | | C 8 | A'B'C D | OK 8' |
| N 29 | DL | | C 9 | A'B C D | OK 9' |
| N 30 | DL | | C 10 | A B C D | OK 10' |
| N 31 | DL | | C 11 | A B'C D | OK 11' |
| N 32 | DL | | C 12 | A B'C D' | OK 12' |
| N 33 | DL | | C 13 | A B C D' | OK 13' |
| N 34 | DL | | C 14 | A'B C D' | OK 14' |
| N 35 | DL | | C 15 | A'B'C D' | OK 15' |

Fig. 3

PRIORITY COUNTER

The invention relates to a device for generating, under the control of a request signal, a treatment signal for one of a number of request lines which can be successively interrogated by an interrogation unit which can be switched through a number of positions thereof under the control of a clock, so that per request line a treatment signal or a wait signal can appear on an output of an output gate.

A device of this kind is used inter alia in conjunction with a computer to which a plurality of peripheral apparatus are connected which can address the computer at arbitrary instants by means of request signals. It can also be said that a request signal then becomes active because also the absence of a signal (for example, zero voltage) can signify a request signal. The computer can perform various activities in reaction to a request signal. In the case of the simultaneous presence of a plurality of request signals, the computer must make a choice. A treatment signal releases the exchange of data between the associated peripheral apparatus and the computer. A wait signal temporarily halts the exchange of information. Instead of a computer which makes a choice from a plurality of peripheral apparatus, it may also be a peripheral apparatus which makes a choice from a plurality of peripheral apparatus and/or computers. A device of this kind can also be used outside the computer field.

If the request signals arrive at fixed instants, for example in synchronism with clock pulses, a device of this kind generally operates satisfactorily. A problem arises if the request signals are asynchronous, that is to say that they can appear at arbitrary instants. In that case a plurality of pulse edges can simultaneously appear, so that undue treatment signal can appear for a brief period of time. After the disappearance thereof, the computer might have started an undesired activity so that time or information can be lost. Even in the case of request signals which become synchronously active, this coincidence can arise. So as to eliminate this drawback the invention is characterized in that the interrogation device comprises a blocking device by means of which a treatment signal can be blocked for a given period, after which the signal can be allowed to pass. The period is so long that all non-stationary phenomena relating to a request signal becoming active and the resultant, however, still blocked, treatment signal have disappeared.

For an interrogation unit use can be made of ring counters having one bistable element per request line, or even per two request lines. So as to allow passage of a treatment signal only after disappearance of non-stationary phenomena and so as to realize an inexpensive interrogation unit, a preferred embodiment according to the invention is characterized in that said positions are the positions of a counter which forms part of the interrogation unit and which is composed of binary counting stages, it being possible to supply the said counter with a count-on signal under the control of a signal from an output of the counter and an inactive request signal, it being possible to mask the said count-on signal under the control of an active request signal. Then, only six bistable counting stages are required for 64 request lines. Furthermore, the counter counts on each time it passes positions with which inactive request signals are associated, and the counter stops when it reaches a position with which an active request signal is associated.

A further preferred embodiment according to the invention is characterized in that each count-on signal can be applied to one bistable stage of the counter which is designed for counting according to a code in which two successive numbers differ in only one binary element. Only one of the bistable stages receives a count-on signal, so that no unvalid intermediate states can appear. This could also be achieved by means of a ring counter, but a ring counter would require much more components. Moreover, the application of each count-on signal to one bistable stage results in a simple set-up.

A further preferred embodiment yet according to the invention is characterized in that the said period is longer than the time required by the interrogation unit to pass through all positions. In this way it is ensured that the counter has stopped before a treatment signal can be generated, so that the said edges can no longer be caused, at least not by the counter.

Another preferred embodiment according to the invention is characterized in that an auxiliary unit is provided which comprises at least two positions and an additional position, the said auxiliary unit being capable of passing through its positions, under the control of the clock pulse, with the exception of said additional position, it being possible to switch said auxiliary unit through to said additional position under the combined control of a request signal on an interrogated request line and a clock pulse, it being possible to generate said wait signal under the control of said at least two positions, and it being possible to generate said treatment signal under the control of said additional position. It is again ensured that the counter has stopped, an additional advantage being achieved in that the treatment signal is generated soon thereafter.

Another preferred embodiment yet according to the invention is characterized in that the interrogation unit can be switched through under the control of one of said at least two positions. As a result, the interrogation unit is synchronized with the auxiliary unit, so that there is no risk of errors and a high clock pulse frequency can be readily used.

A further preferred embodiment yet according to the invention is characterized in that said additional unit is a counter having four positions and two additional positions. In that case the construction of the auxiliary unit is very simple.

Another preferred embodiment yet according to the invention is characterized in that set inputs are provided for signals in reaction to which the counter can be set to a predetermined position after the generation of a treatment signal. By applying additional signals to these set inputs, a high priority can be given to one or more predetermined request lines after treatment of a request, while the general principle of cyclic interrogation of the request lines is maintained.

It is a further aspect of the invention that said output gates have additional signal input terminals. As a result, the output gates can perform more functions.

The invention will be described in detail hereinafter with reference to some figures.

FIG. 3 shows a device according to the invention for a plurality of requesters;

Figure 1:
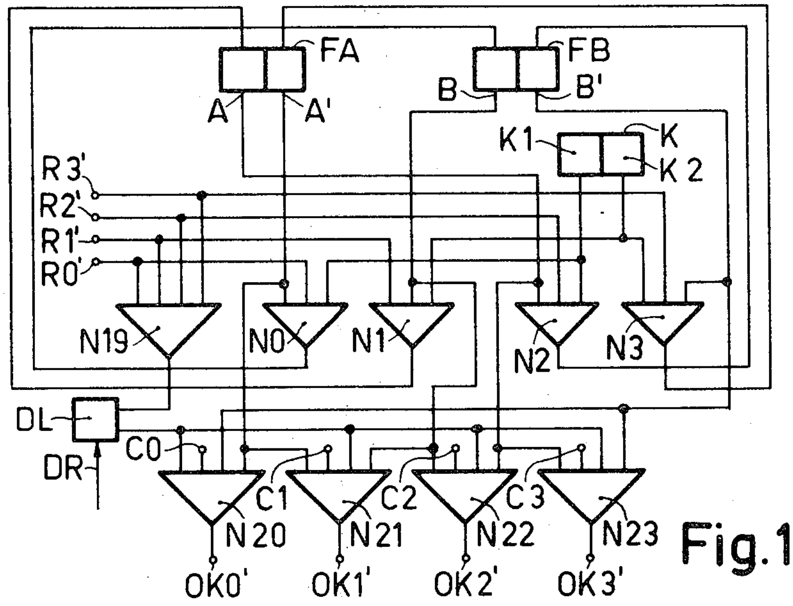
FIG. 1 shows a first device according to the invention.

FIG. 1 shows a first device according to the invention, comprising four input terminals RO', R1', R2', R3', one input DR, four input terminals CO, C1, C2, C3, one clock K, consisting of two clock parts K1 and K2, nine logic NAND-gates, NO, N1, N2, N3, N19, N20, N21, N22, N23, two flipflops FA and FB which together constitute a counter, one delay unit DL, and four output terminals OKO', OK1', OK2' and OK3'.

The device operates as follows. There are four requesters 0 . . . 3 which are not shown. All elements associated with a requester are numbered accordingly. The terminals RO'. . . . SR3' are connected to request lines. Present on these terminals are the inverted values of the request signals, which is denoted by an accent. An inactive request signal makes the associated terminal high, while an active request signal renders it low. The outputs of the clock parts K1 and K2 are normally low, so that the outputs of the logic NAND-gates NO . . . . N3 are normally high. The clock parts K1 and K2 regularly supply a clock pulse in an alternating manner, with the result that the relevant input of the logic NAND-gates N0, N2 and N1, N3, respectively, becomes high. Assume that all request signals are inactive, and that the flipflops FA and FB are in the set state. The outputs A and B are then high. If clock part K1 supplies a clock pulse, all inpputs of the logic NAND-gate N2 become high, so that the output thereof becomes low. The logic NAND-gates NO, N1 and N3 all have at least one low input. The output signal of N2 which acts as a count-on signal is applied to the flipflop FB, with the result that the latter is reset. Consequently, the input of the logic NAND-gate N3 which is connected to the B' becomes high, but the input of N3 which is connected to K2 is still low. Subsequently, after termination of the clock pulse of the clock part K1, the clock part K2 supplies a clock pulse, so that the logic NAND-gate N3 receives three high signals and resets the flipflop FA by means of its output signal which becomes low. As a result, the output A' becomes high. The next clock pulse from clock part K1 makes the output of the logic NAND-gate NO low, so that the flipflop FB is set. The next clock pulse from K2 makes the output of the logic NAND-gate N1 low, with the result that flipflop FA is set. The initial situation is then reached again, and the counter (FA, FB) thus passes through all counting positions. Meanwhile, the output of the delay unit DL is low and the resultant high signals on the output terminals OKO'. . . OK3' acts as wait signals for the treatment of the request signals which are still inactive. The terminals CO . . . . C3 can still be high or low at random because DL has a blocking action.

Assume that one of the request signals becomes active, for example, that of the requester O. In that case RO' becomes low, and the output of the logic NAND-gate N19 becomes high. As a result, the delay unit DL is activated. The clock parts K1 and K2 supply pulses at regular intervals. The output signals of the gates N2 and N3 finally reset the flipflops FA and FB, with the result that the output A' becomes high. When the clock part K1 supplies the next clock pulse, the counter stops because the count-in signal of the logic NAND-gate NO is masked by the low signal on terminal RO'. The delay time of the delay unit is slightly longer than the time which is required to pass through all positions of the counter formed by the flipflops FA and FB. The output of DL then becomes high. The outputs B' and A' were already high. If the termainal CO also carries a high signal, the output terminal OKO' of the logic NAND-gate N20 also becomes low. A treatment signal is then present for requester O. The delay time ensures that the counter has always arrived in the correct position. Any varying signals or briefly present unvalid conditions then have no effect. Additional functions can be realized by means of the terminals DR and CO . . . . C3. A pulse on DR can reset the delay unit DL so that the treatment of a subsequent request signal is delayed again. If this takes place at the beginning of the treatment of a request signal, the counter can quickly reach the correct position in reaction to an active request signal, while the treatment of a request signal which previously became active still continues. To this end, the terminals CO . . . . C3 are low, which means that a treatment is being performed. As soon as the treatment is finished, these terminals become high so that the treatment signal is directly generated, provided that the output of DL is already high (and hence that the counter has stopped).

Figure 2:
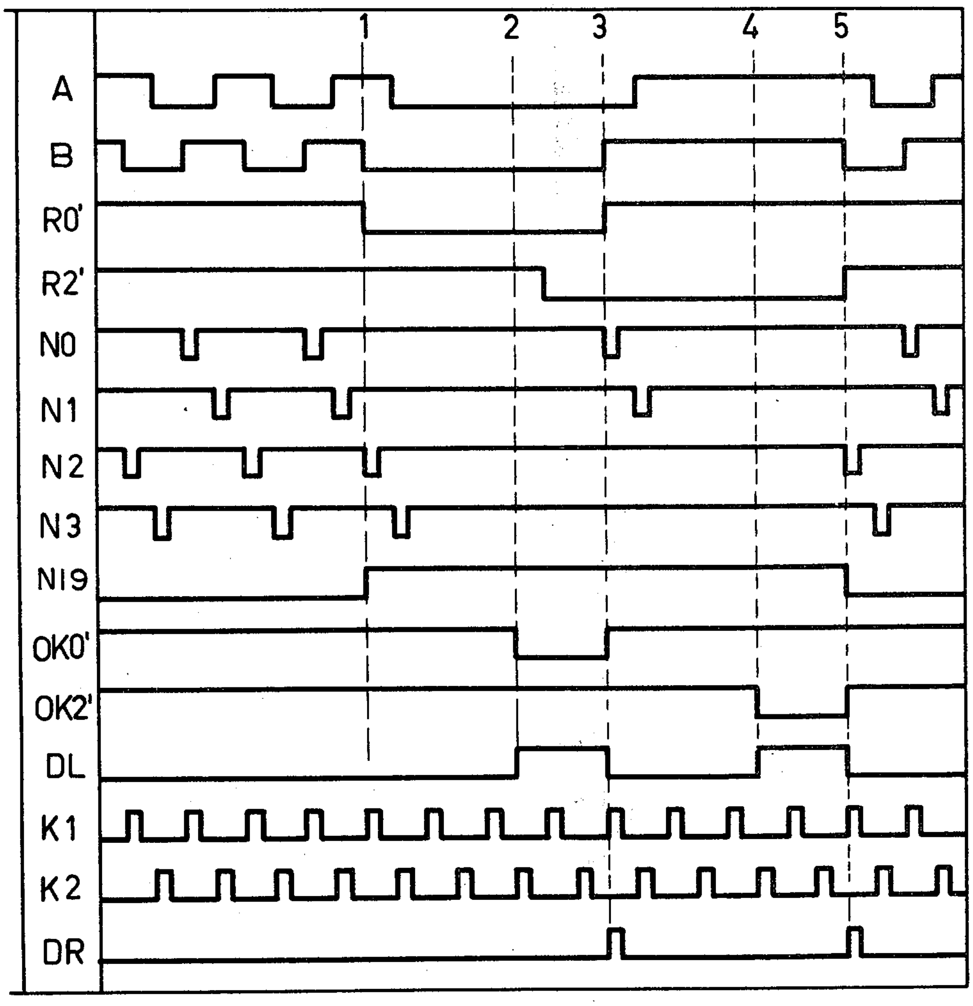
FIG. 2 shows a time diagram of a number of signals.

On the basis of the foregoing, FIG. 2 shows a time diagram of a number of signals in the device according to the invention. Initially there are no active request signals, the gates NO . . . . N3 successively supply low signals so that the counter (signals A, B) circulates. The signals A' and B' are the signals A and B in an inverted form, so they are omitted. The terminals R'1, R'3, OK1' and OK3' are always positive in this example and they have also been omitted. At (1) RO' receives an active request signal, in this case during the count-on signal of N2. If the delay unit DL were not provided and if R2' had become active, the output gate N22 could have supplied a brief pulse. However, due to delay time effects it is also possible that another output gate supplies a very brief low signal. This could produce a serious error. Such brief signals can counteracted by taking logic steps. However, in the case of an extensive circuit many signal combinations can cause errors of this kind, so that the risk of errors is increased. The counter-measures would require many components. Furthermore, in the case of two simultaneously changing signals, brief signal pulses can always be expected. According to the invention, the output of gate N19 becomes high at the instant 1 and the delay unit DL is started. The gates N2 and N3 still supply a count-on signal, but subsequently the counter is stopped. The time delay introduced by DL is longer than the time required by the counter (FA, FB) to complete a cycle (in this case 5/4 times as long), and when the output of DL becomes high, the counter has stopped in any case. As a result, at instant (2) the terminal OKO' becomes low, which acts as a treatment signal.

Subsequently, the request signal on R2' becomes active, but as long as RO' remains low, the count-on signal for the counter remains masked. At the instant 3 the delay unit DL is reset by a pulse on DR, and the request signal on RO' becomes inactive. This can take place when the computer starts the activities desired by requester O. This can take place, for example, in that terminal DR receives the signal from RO' via an OR-gate (not shown) via a differentiating element. The output of this differentiating element is connected to an input of a bistable unit which forms part of DL. The other input of DL is then connected, via a delay element, to a second (set) input of this bistable unit. After resetting, the delay unit DL directly starts a new delay time, the counter receives a count-on signal twice, and subsequently stops again. When the request from requester O has been dealt with at instant 4 (at the end of the second delay time of DL), the treatment signal OK2′ becomes low, so that the request from requester 2 is granted. At instant 5 the delay unit DL is reset by a pulse on DR. The output of gate N19 then becomes low, so that the counter continues to receive count-on signals and the initial situation has been restored. If the time required for the treatment of requester O exceeds the delay time of the delay unit DL, the treatment signal occurring (in this case for requester 2) can be blocked by a low signal on the additional signal input terminals CO - - - C3 of the output gates N20 . . . . N23. This signal becomes high each time when there is no request being treated. Consequently, there are asynchronous signals, i.e. RO′ and R2′ becoming low and DL and the terminals C0 . . . . C3 possibly becoming high. The change-over to the active state of the request signals is controlled by the requesters, and will usually not take place at fixed instants. The change of DL and CO . . . . C3 can take place at an arbitrary instant. However, because the relevant instant can be predicted, they will usually be laid down in a given phase of the clock pulse cycle. The other changes are controlled by the clock so that they are synchronous.

FIG. 3 shows a diagram of an embodiment according to the invention for 16 requesters. Only the relevant signal values will be coincidered in the diagram. The counter comprises four flipflops FA, FB, FC, FD which supply the signals A, A′, B, B′, C, C′, and D, D′. Instead of four logic NAND-gates NO . . . . N3, the device now comprises sixteen NAND-gates NO . . . . N15; instead of four logic NAND-gates N20 . . . . N23, it now comprises sixteen NAND-gates N20 . . . . N35. Also provided are a clock K having two clock parts K1 and K2, a logic NAND-gate N19, and a delay unit DL. The element which are not mentioned hereinafter are incorporated in the circuit in the same manner as in FIG. 1. The first column of FIG. 3 shows the logic NAND-gates, the adjoining block the signals on the input terminals thereof, and the last column shows the terminals to which the output is connected.

Each of the gates N20 . . . . N35 can receive a signal from each of the flipflops FA . . . . FD according to a code where the combinations applied to two successive gates differ in only one element. May of such codes are known, for example the gray codes. The classical binary code can also be used, but in that case outputs of the gates NO . . . N15 must be connected to more inputs of the flipflops FA . . . . FD. The additional wiring is objectionable. The gates N0 . . . . N15 can be connected to the outputs of only three flipflops in that a double clock pulse is present, so that $2^4 = 16$ combinations are still produced. In FIG. 1 the gates NO . . . . N3 are connected to the output of one flipflop only. Example: N28 receives the signals A′, C, D. These signals also appear on the inputs of N29. The corresponding gates N8 and N9, however, receive different clock pulses.

If desired, a single clock pulse can alternatively be used. This requires a time delay between the switching over of the flipflops and the formation of the output siganl of the logic NAND-gates NO . . . . N15 which becomes low.

The notation in the last column of FIG. 3 (upper half) is such that, for example, B signifies that flipflop FB is reset so that the signal B becomes high.

Figure 4:
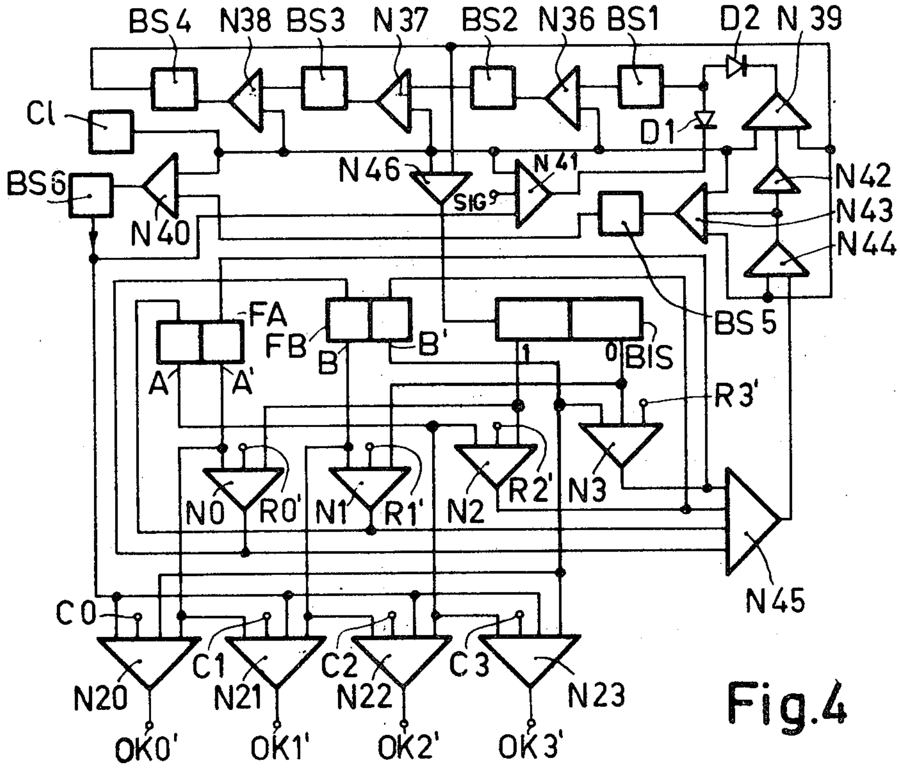
FIG. 4 shows a second device according to the invention.

FIG. 4 shows another embodiment according to the invention which corresponds substantially to FIG. 1 for four request lines. The clock K, the delay unit DL and the gate N19, however, are omitted. The device comprises a clock C1, 11 logic NAND-gates N36 . . . . N46, seven bistable elements BS1 . . . . 6 and BIS as new elements. If the counter (BS1 . . . . BS6) is not in the end position, it acts as a blocking device. Also provided are two diodes D1 and D2.

The single clock C1 supplies a positive clock pulse at regular intervals. There are no active request signals and the bistable element BS1 is in the set state, so that its output supplies a high signal. At the next clock pulse, the logic NAND-gate N36 receives two high signals. As a result, its output becomes low and the bistable element BS2 is set. A signal on a connection not shown (generated, for example, by means of a differentiating element which detects the position of BS2) resets the bistable element BS1. In this manner, only one of the bistable elements BS1 . . . . 6 is always set. In reaction to the next two clock pulses, the bistable elements BS3 and BS4, respectively, are set. At the next clock pulse, the logic NAND-gate N46 receives two high signals, i.e. from the bistable element BS4 and from the clock C1, with the result that its output becomes low. This signal is applied to the bistable element BIS which perform the function of the clock K of FIG. 1 and which alternately supplies a pulse on one of its outputs, "0" and "1", respectively, under the control of low signals from the logic NAND-gate N46. Each of these outputs can comprise, for example, a differentiating element which detects the position of the bistable element BIS.

In the same manner as described with reference to FIG. 1, a signal is supplied to the counter which consists of the flipflops FA and FB. If a count-on signal appears, the logic NAND-gate N45 receives one low signal, so that its output becomes high. The logic NAND-gate N44 then receives two high signals, i.e. from the bistable element BS4 and from the logic NAND-gate N45, so that its output becomes low. The logic NAND-gate N42 then receives a low signal, so that its output becomes high. The logic NAND-gate N39 receives signals from the bistable element BS4, from the clock pulse and from the gate N42. If all three signals are high, its output becomes low with the result that the bistable element BS1 is set via the diode D2, and the bistable element BS4 is reset. The auxiliary unit. comprising the bistable elements BS1 . . . . BS4, is thus returned to the starting position and the counter consisting of FA and FB has advanced one step. If no request signals become active, the request lines (terminals RO′ - - - -R3′) are thus interrogated in succession.

If a request signal becomes active, the counter stops when the associated position is reached. This was previously described with reference to FIG. 1. Because one of the signals RO′. . . . R3′ is low, the output of the associated one of the gates NO . . . . N3 cannot become low. After the last count-on signal, the bistable elements BS1 . . . . BS4 are successively set. When the element BS4 has been set, however, the logic NAND-gate N44 does not receive two high signals in reaction to the next clock pulse, so that the output of gate N44 remains high and the output of gate N42 remains low. The logic NAND-gate N43 receives signals from the clock C1, the bistable element BS4, and the logic NAND-gate N44, and all these signals can become high so that gate N43 supplies a low signal. It may be necessary to synchronize the clock pulse and the pulse of the logic NAND-gate N44 (not appearing in this case), but such steps are known and will not be described in this context. The low signal of gate N43 sets the bistable element BS5 and resets the bistable element BS4. In the same manner, the bistable element BS6 is subsequently set (and BS5 is reset) in reaction to the next clock pulse of the clock C1. As a result of the high signal of the element BS6 and the position of the flipflops FA and FB, and any signals on the signal input terminals CO . . . . C3, at the most one of the output gates N20 . . . . N23 can exclusively receive high signals, so that its output becomes low. This signal forms a treatment signal for the active request signal on the corresponding terminal RO'. . . . R3'.

The signal terminal SIG normally has a low voltage, so that further clock pusles have no furtehr effect, at least not with respect to the circuit of FIG. 4. When the request has been dealt with, this terminal becomes high for some time, for example, during 1½ clock pulse intervals. In reaction to the next clock pulse, the logic NAND-gate N41 then receives three high signals with the result that, via the diode D1, the bistable element BS1 is set and BS6 is reset. The initial situation is then reached again.

The signal of the signal terminal SIG can alternatively be applied to set inputs of the flipflops FA and FB. These may be the already shown inputs, so that the counter can be preset to a given starting position and given channels can be interrogated before other channels. In this way the priority sequence can be manipulated.

The advantage of the embodiment according to FIG. 4 wich respect to that of FIG. 1 is that the waiting time for the treatment signal amounts to only about one half cycle time of the counter (FA, FB). On the other hand, the circuit of FIG. 2 requires less components.

It will be obvious that instead of the auxiliary unit BS1 . . . . BS6, a different auxiliary counter comprising, for example, three bistable stages and operating according to a code in which two successive numbers differ in only one binary element can be used.

What is claimed:

1. A device for determining priority among request signals occurring at arbitrary instants on request line terminals of a plurality of outer stations, comprising: an interrogation unit including a succession of switching stages and a clock pulse generator for successively driving the positions of all said stages, during a predetermined period; blocking means including gating means coupled between said stages and said terminals to stop the driving of said stages in response to the occurrence of a first request signal on said terminals and produce a treatment signal for the station at which said first request signal has occurred, and delay means activated by said request signal for blocking the generation of the treatment signal for a waiting time interval exceeding the time between the instant of the stopping of said stages and the end of said predetermined period characterized in that an auxiliary unit is provided, which comprises at least two switching positions and an additional switching positions, means controlled by the clock pulse generator for driving the said auxiliary unit through its positions, with the exception of said additional position, means for switching said auxiliary unit through to said additional position under the combined control of a request signal on an interrogated request line terminal and a clock pulse, means for generating a wait signal under the control of at least one of said two positions, and means for generating said treatment signal under the control of said additional position.

2. A device as claimed in claim 1, characterized in that the interrogation unit is switched through under the control of at least one of said two positions.

3. A device as claimed in claim 2, characterized in that said auxiliary unit is a counter having four positions and two additional positions.

4. A device for determining priority among request signals occurring at arbitrary instants on request line terminals of a plurality of outer stations, comprising: an interrogation unit including a succession of switching stages and a clock pulse generator for successively driving the positions of said stages for a predetermined period; blocking means including gating means coupled between said stages and said terminals to stop the driving of said stages in response to the occurrence of a first request signal on said terminals and produce a treatment signal for the station at which said first request signal has occurred, and delay means for blocking the generation of the treatment signal for a time interval exceeding the time between the instant of the stopping of said stages and the end of said predetermined period said gating means including a first set of NAND gates each having a first input connected to an assigned terminal, a second input connected to said clock pulse generator, a third input connected to the output of an assigned stage, and an output connected to the input of said stage; a second set of NAND gates each having an input connected to an assigned switching stage, a second input connected to the output of said delay means and an output for producing a treatment signal and, alternatively a wait signal for a station; and an additional NAND gate having inputs connected to said terminals and an output connected to the input of said delay means.

5. A device as claimed in claim 4, wherein said second set of NAND gates further comprises additional inputs for signals in reaction to which the counter can be set to a predetermined position after the generation of a treatment signal.

6. A device according to claim 4, wherein said succession of switching stages is a binary counter, the output of said first set of NAND gates providing count-on signals for driving said counter.

7. A device as claimed in claim 6, characterized in that each count-on signal is, applied to one bistable stage of the counter which is constructed for counting according to a code in which two successive numbers differ in only one binary element.

* * * * *

UNITED STATES PATENT OFFICE
CERTIFICATE OF CORRECTION

PATENT NO. : 3,876,868
DATED : April 8, 1975
INVENTOR(S) : HANS CRAMWINCKEL ET AL It is certified that error appears in the above-identified patent and that said Letters Patent are hereby corrected as shown below:

IN THE TITLE PAGE, Section [30] change "Mar. 21, 1972"

to--Mar. 31, 1972--.

Signed and Sealed this

*thirtieth* Day of *September 1975*

[SEAL]

*Attest:*

RUTH C. MASON
*Attesting Officer*

C. MARSHALL DANN
*Commissioner of Patents and Trademarks*